(No Model.)
C. P. GOSS.
WICK TUBE FOR OIL STOVES.
No. 438,842. Patented Oct. 21, 1890.
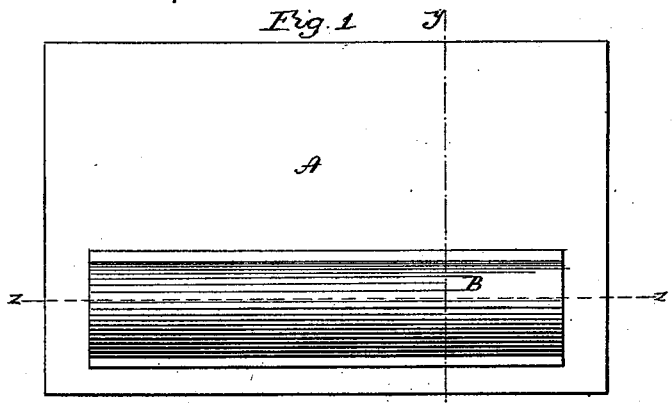
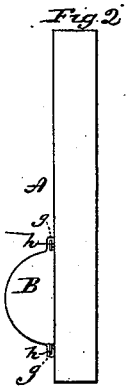
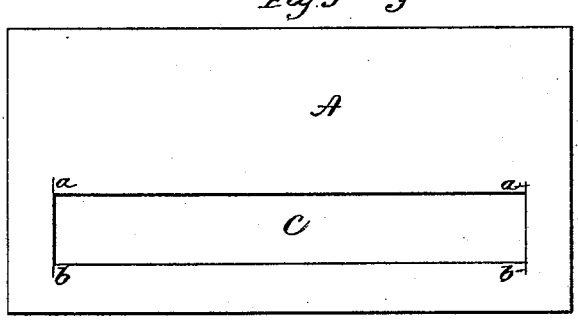
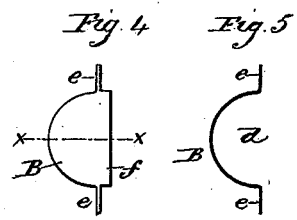
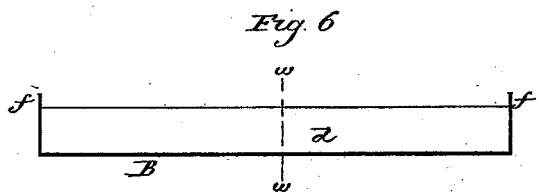
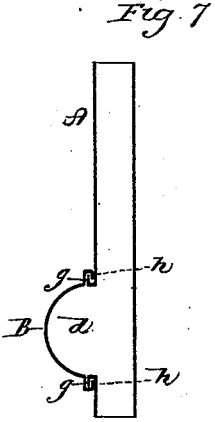
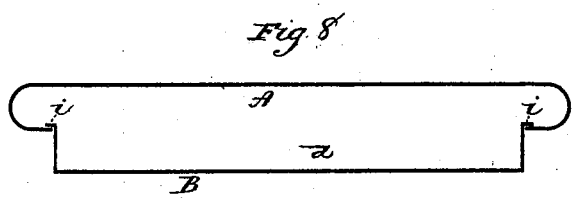
Witnesses
Chauncey P Goss
Inventor
Earle Seymour

UNITED STATES PATENT OFFICE.

CHAUNCEY P. GOSS, OF WATERBURY, CONNECTICUT, ASSIGNOR TO THE SCOVILL MANUFACTURING COMPANY, OF SAME PLACE.

WICK-TUBE FOR OIL-STOVES.

SPECIFICATION forming part of Letters Patent No. 438,842, dated October 21, 1890.

Application filed May 12, 1890. Serial No. 351,454. (No model.)

*To all whom it may concern:*

Be it known that I, CHAUNCEY P. GOSS, of Waterbury, in the county of New Haven and State of Connecticut, have invented a new Improvement in Wick-Tubes for Oil-Stoves; and I do hereby declare the following, when taken in connection with the accompanying drawings and the letters of reference marked thereon, to be a full, clear, and exact description of the same, and which said drawings constitute part of this specification, and represent, in—

Figure 1, a side view of a wick-tube looking toward the housing side; Fig. 2, an end view of the same; Fig. 3, a side view of the wick-tube as prepared to receive the housing; Fig. 4, an end view of the housing detached; Fig. 5, a vertical section of the housing on line $w\ w$ of Fig. 6; Fig. 6, a longitudinal section of the housing on line $x\ x$ of Fig. 4. Fig. 7, a vertical central section through the tube on line $y\ y$ of Fig. 1. Fig. 8, a longitudinal section on line $z\ z$ of Fig. 1.

This invention relates to an improvement in wick-tubes such as used in kerosene-stoves and other places where a broad flat wick is desirable. In these wicks it is necessary to inclose the ratchet, which operates as the wick-adjuster, and this is accomplished by forming a housing as a part of the wick-tube, said housing running transversely across one side of the wick-tube, open upon the inside directly into the tube, and so that the adjuster-shaft may run longitudinally through the said housing, the ratchets standing within the housing.

The object of my invention is to make the housing separate from the wick-tube, but unite it therewith, so that it becomes a permanent part thereof and produces the housing as close as when made an integral part of the tube; and the invention consists in the construction, as hereinafter described, and particularly recited in the claim.

The wick-tube is made from sheet metal. A represents the housing side of the tube; B, the housing, which is of the usual semicircular form in transverse section. To prepare the tube for the reception of the housing, an opening C is cut therein, corresponding to the length of the housing, but somewhat narrower than the inner width of the housing. At each end of this opening short vertical slits $a$ are formed upon both the upper and lower sides of the opening, these slits extending to the full width of the required housing-opening, as seen in Fig. 3. The housing B is made from a separate piece of sheet metal of the usual semicircular form, its inner side, as at $d$, being of the width required for the opening of the housing into the wick-tube.

On both the upper and lower edges of the housing a flat flange $e$ is formed, as seen in Figs. 4 and 5, these flanges being substantially in the plane of the outer surface of the wick-tube. At each end of the housing is an inwardly-projecting flange $f$, as seen in Figs. 4 and 6—that is to say, this flange $f$ extends from the ends of the housing on the open side inward at right angles to the plane of the housing, and the external length of the housing corresponds to the length of the opening C in the wick-tube.

The metal at each side of the opening C in the wick-tube is turned outward and over into a plane substantially parallel with the plane of the tube, as at $g\ g$, Fig. 7. The flanges $e\ e$ on the housing are turned inward, as seen at $h$, Fig. 7, and so as to interlock with the turned-over edges $g\ g$ of the tube. The flanges $f$ pass through the opening C at the ends and are turned over onto the inside of the tube at each end, as at $i$, Fig. 8. The interlocking flanges $g\ h$ are closed down hard upon the wick-tube, as seen in Fig. 2, and the inner internal flanges $e$ at the ends are closed down upon the inside, so as to make a tight joint around the housing and firmly unite the housing with the wick-tube, the union thus produced being of the strongest possible character and substantially as close as if the housing were made an integral part of the tube. By this construction the liability of destroying the tube in the formation of the housing is avoided, as only that metal of which the housing is formed is exposed to the stress of the operation of shaping the housing. This construction also enables the formation of the tube from lighter metal than when the housing is made integral with the tube, so that the tube complete is no heavier than the tube when the housing is made integral therewith.

The union of the housing with the wick-tube by the lapped joints described avoids the necessity of soldering, as the joints are substantially gas-tight.

The wick-adjuster is arranged and introduced substantially the same as in this class of wick-tubes. Such wick-adjuster, not being essential to this invention, is not illustrated.

I do not broadly claim a wick-tube having a housing for the wick-adjuster made separate from the wick-tube and attached thereto.

I claim—

A sheet-metal wick-tube having the housing for the wick-adjuster made separate from the tube, the tube constructed with an opening C, in length corresponding to the length of the housing, with vertical slits $a\ b$ upon both sides of the said opening at both ends, the housing constructed with a flange $e$ upon both its upper and lower edges and with an inwardly-projecting flange $f$ at each end, the said flanges $e$ interlocked upon the outside of the tube with the metal of the wick-tube between the end slits $a\ a$ and $b\ b$ of the opening, the said flanges $f$ projecting into the interior of the tube at the ends of the opening and closed down upon the inside of the tube at the respective ends, substantially as described.

CHAUNCEY P. GOSS.

Witnesses:
T. R. HYDE, Jr.,
M. L. SPERRY.